United States Patent [19]

Tanaka

[11] Patent Number: 5,623,003
[45] Date of Patent: Apr. 22, 1997

[54] COATING COMPOSITIONS CONTAINING POLYESTER RESIN, EPOXY RESINS AND AN ANTICORROSION PIGMENT

[75] Inventor: Shoichi Tanaka, Hiratsuka, Japan

[73] Assignee: Kansai Paint Co., Ltd., Amagasaki, Japan

[21] Appl. No.: 661,566

[22] Filed: Jun. 11, 1996

Related U.S. Application Data

[63] Continuation-in-part of Ser. No. 409,659, Mar. 24, 1995, abandoned.

[30] Foreign Application Priority Data

Mar. 29, 1994 [JP] Japan .................................... 6-84086

[51] Int. Cl.$^6$ ............................. C08K 3/18; C08L 63/04; C08L 67/02
[52] U.S. Cl. .......................... 523/428; 523/429; 523/458; 525/438
[58] Field of Search .................................. 523/428, 429, 523/458; 525/438

[56] References Cited

U.S. PATENT DOCUMENTS

| | | | |
|---|---|---|---|
| 3,749,758 | 7/1973 | Gasson | 525/438 |
| 4,756,935 | 7/1988 | Takimoto | 523/465 |
| 5,013,791 | 5/1991 | Kerr | 525/438 |

FOREIGN PATENT DOCUMENTS 2075021 11/1981 United Kingdom ................... 525/438

*Primary Examiner*—D. R. Wilson
*Attorney, Agent, or Firm*—Fisher, Christen & Sabol

[57] ABSTRACT

A coating composition containing a resin composition consisting of (A) 10 to 90 parts by weight of at least one resin selected from polyester resin having a glass transition temperature of −5° C. to 80° C. and a number average molecular weight of 5,000 to 30,000, and epoxy-modified polyester resin having a glass transition temperature of 10° C. to 130°0 C. and a number average molecular weight of 6,000 to 30,000; (B) 5 to 70 parts by weight of novolac-based epoxy resin and (C) 5 to 40 parts by weight of a curing agent per 100 parts by weight of the resin composition respectively; and (D) 20 to 120 parts by weight of an anticorrosion pigment per 100 parts by weight of the resin composition.

8 Claims, No Drawings

COATING COMPOSITIONS CONTAINING POLYESTER RESIN, EPOXY RESINS AND AN ANTICORROSION PIGMENT

This is a continuation-in-part of U.S. Ser. No. 08/409,659, filed on Mar. 25, 1995 now abandoned.

BACKGROUND OF THE INVENTION

1. Field of the Invention

The present invention relates to a coating composition capable of forming a coated film having excellent properties in corrosion resistance, boiling water resistance and fabrication properties, and having excellent coating workability.

2. Description of the Background Art

A precoated steel sheet prepared by coil coating or the like has widely been used in the art as building materials such as roofs, walls, shutters and the like for an architectural structure, and as housing-related goods such as various kinds of household appliances, ventilation fans, panel boards, steel furniture and the like.

The above building materials and goods are prepared by a process which comprises cutting the precoated steel sheet and subjecting to fabrication such as press molding, and consequently have an edge face on which a metal surface has been exposed by cutting and a fabricated portion. A portion of the cut edge face may more easily be corroded compared with other uncut portions, and cracking on the fabricated portion may result in developing blisters and rust.

Coating of a coating composition containing a chromate-based anticorrosion pigment in a large amount has been carried out in the art for the purpose of improving corrosion resistance in the above cut edge face and fabricated portion with cracks. However, use of a large amount of the anticorrosion pigment in the coating composition may raise such problems that since the anticorrosion pigment generally has high solubility in hot water, dipping of a resulting coated film into a boiling water may result in developing blisters on the surface of the coated film.

For the purpose of reducing crackings developed in the above fabricated portion, use of a coating composition comprising a combination of a high molecular weight polyester resin or epoxy-modified polyester resin as a resin component of the coating composition with a curing agent has been proposed in the art. However, the use of the above coating composition raises problems of such a poor coating workability that viscosity control to be suitable for coating results in undesirably lowering a nonvolatile matter content because of high viscosity of the coating composition, that applicability in carrying out roll coater coating may be reduced, and that even if the applicability should be satisfactory, a high speed coating at a line speed of 80 m per minute or higher may result in forming a roll mark on a coated film, forming a non-uniform coated film, or developing film defects such as cissing.

SUMMARY OF THE INVENTION

It is an object of the present invention to provide a coating composition capable of forming a coated film having excellent properties in corrosion resistance, boiling water resistance and fabrication properties, and having excellent coating workability.

That is, the present invention provides a coating composition containing a resin composition consisting of (A) 10 to 90, preferably 20 to 70 parts by weight of at least one resin selected from polyester resin and epoxy-modified polyester resin, (B) 5 to 70, preferably 20 to 50 parts by weight of novolac-based epoxy resin and (C) 5 to 40, preferably 10 to 30 parts by weight of a curing agent per 100 parts by weight of the resin composition respectively; and (D) 20 to 120, preferably 30 to 100 parts by weight of an anticorrosion pigment per 100 parts by weight of the resin composition.

DETAILED DESCRIPTION OF THE INVENTION

The component (A) in the present invention is at least one resin selected from polyester resin and epoxy-modified polyester resin.

The above polyester resin is preferably a polyester resin having a glass transition temperature of $-5°$ C. to $80°$ C. as measured by differential thermal analysis (DTA) at a heating speed of $10°$ C./minute, and a number average molecular weight of 5,000 to 30,000.

The above polyester resin may be prepared by reacting an acid component mainly containing aromatic dicarboxylic acid or aliphatic dicarboxylic acid with an alcohol component mainly containing dialcohol.

Examples of the aromatic dicarboxylic acid may include terephthalic acid, isophthalic acid, phthalic acid, naphthalene dicarboxylic acid, lower alkyl esters thereof, acid anhydrides thereof, and the like, at least one of which may be used.

Examples of the aliphatic dicarboxylic acid may include adipic acid, sebacic acid, azelaic acid, succinic acid, fumaric acid, maleic acid, 3,6-endomethylene-$\Delta^4$-tetrahydrophthalic acid, 1,6-cyclohexane dicarboxylic acid and the like, lower alkyl esters thereof, acid anhydrides thereof, and the like, which may be used alone or in combination.

In addition to the above dicarboxylic acids, the acid component may contain monocarboxylic acid and trivalent or higher carboxylic acids in a small amount respectively. Examples of monocarboxylic acid may include p-t-butyl benzoic acid and the like, and examples of trivalent or higher carboxylic acids may include trimellitic acid, pyromellitic acid, trimesic acid, methylcyclohexene tricarboxylic acid, acid anhydrides thereof, and the like.

Examples of the dialcohol may include ethylene glycol, propylene glycol, 1,2-propane diol, 1,3-propane diol, 1,3-butane diol, 1,4-butane diol, neopentyl glycol, 1,5-pentane diol, 1,6-hexane diol, 3-methylpentane diol, diethylene glycol, 1,4-cyclohexane dimethanol, 3-methyl-1,5-pentane diol, 2-methyl-1,3-propane diol, 2,2-diethyl-1,3-propane diol, 2-butyl-2-ethyl-1,3-propane diol, xylylene glycol, hydrogenated bisphenol A, ethylene oxide or propylene oxide adduct of bisphenol A, and the like, which may be used alone or in combination.

In addition to the above dialcohol, the alcohol component may contain trivalent or higher alcohols, examples of which may include trimethylol ethane, trimethylol propane, glycerine, pentaerythritol and the like.

The above acid component and alcohol component may partly be replaced with an oxyacid component selected from dimethylol propionic acid, oxy pivalic acid, paraoxy benzoic acid and the like; lower alkyl esters thereof; lactones such as ε-caprolactone and the like.

The polyester resin may be prepared from the above acid component and alcohol component, and, optionally the oxyacid component by the conventionally known esterification reaction or ester exchange reaction.

The above polyester resin preferably has a glass transition temperature in the range of −5° C. to 80° C. from the standpoints of fabrication properties and chemical resistance, and preferably has a number average molecular weight of 5,000 to 30,000 from the standpoints of fabrication properties and coating workability.

The epoxy-modified polyester resin usable as the component (A) in the present invention may include, for example, a reaction product obtained by a reaction such as addition, condensation, grafting or the like between the polyester resin prepared from respective components used for the preparation of the above polyester resin in the present invention and epoxy resin, for example, a reaction product of carboxyl group of the polyester resin with an epoxy group-containing resin, and such a reaction product that the hydroxyl group in the polyester resin is bound to hydroxyl group in the epoxy resin through a polyisocyanate compound.

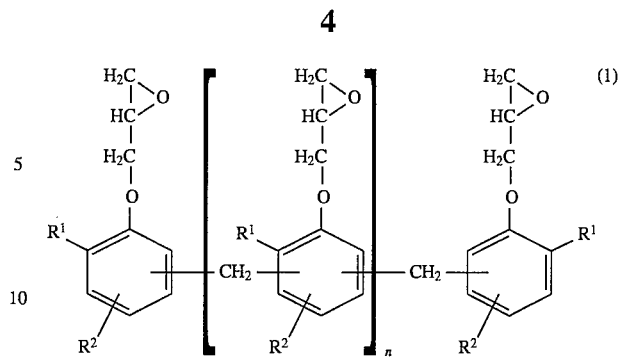

where $R^1$ represents hydrogen atom or methyl group, $R^2$ represents hydrogen atom, alkyl group having 1 to 4 carbon atoms, phenyl group, aralkyl having 7 to 10 carbon atoms, and n represents an integer of 2 to 12;

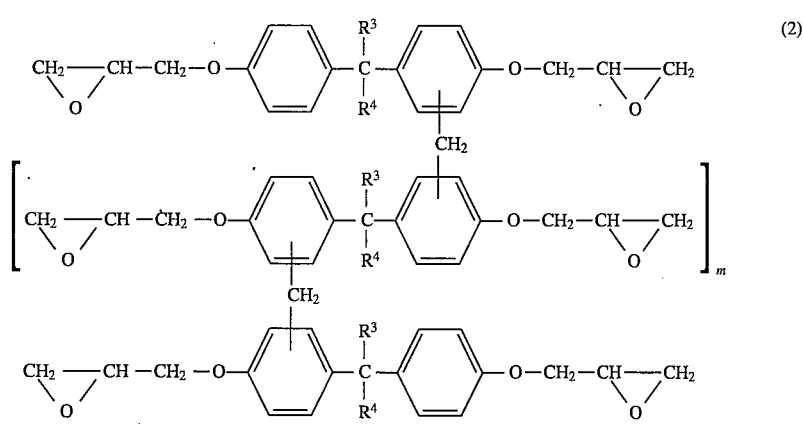

The above epoxy-modified polyester resin preferably has a glass transition temperature of 10° C. to 130° C. as measured by differential thermal analysis (DTA) at a heating speed of 10° C./minute from the standpoints of fabrication properties and chemical resistance, and preferably has a number average molecular weight of 6,000 to 30,000 from the standpoints of fabrication properties and coating workability.

The novolac-based epoxy resin as the component (B) in the present invention may include, for example, various novolac-based epoxy resins such as phenol novolac epoxy resin, cresol novolac epoxy resin, phenol glyoxalic epoxy resin having generally 4 to 16 epoxy groups in the molecule and the like, and preferably has a number average molecular weight of 2,000 or less, preferably 600 to 2,000.

The typical examples of the novolac-based epoxy resin used in the present invention may include ones represented by the following general formulas (1), (2) and (3):

where $R^3$ and $R^4$ are same or different respectively and represent hydrogen atom or alkyl group having 1 to 3 carbon atoms, and m represents an integer of 1 to 5; and

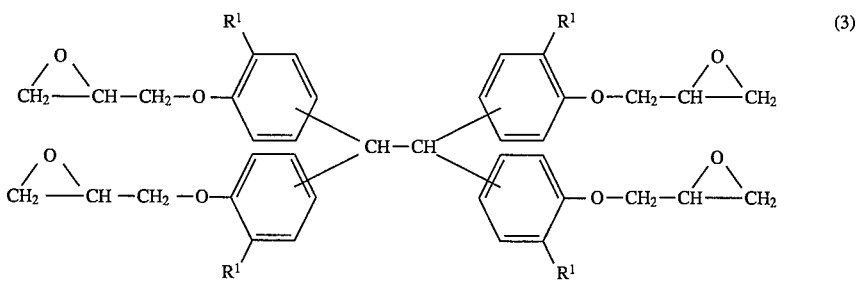

where $R^1$ is defined as above.

Examples of alkyl group having 1 to 4 carbon atoms as $R^2$ in the above general formula (1) may include groups such as methyl, ethyl, isopropyl, t-butyl and the like, and examples of aralkyl group having 7 to 10 carbon atoms therein may include groups such as benzyl, α-methylbenzyl, α,α-dimethylbenzyl, phenethyl and the like.

Examples of alkyl group having 1 to 3 carbon atoms as $R^3$ and $R^4$ in the above general formula (2) may include groups such as methyl, ethyl, n-propyl and the like.

Examples of commercially available novolac-based epoxy resin used in the present invention may include Epikote 152 and Epikote 154 (trade name, marketed by Yuka Shell Epoxy Co., Ltd. respectively), EPPN-201 (trade name, marketed by Nippon Kayaku Co., Ltd.), Epo Tohto YDPN- 638 (trade name, marketed by Tohto Kasei Co., Ltd.) and the like as phenol novolac epoxy resin; Epikote 180S65 and Epikote 180H65 (trade name, marketed by Yuka Shell Epoxy Co., Ltd. respectively), EOCN-102S, EOCN-103S, and EOCN-104S (trade names, marketed by Nippon Kayaku Co., Ltd. respectively), Epo Tohto YDCN-701 to 704 (trade names, marketed by Tohto Kasei Co., Ltd. respectively) and the like as cresol novolac epoxy resin and others such as Epo Tohto ZX-1071T, Epo Tohto ZX-1015, Epo Tohto ZX-1247 and Epo Tohto YDG-414S (trade names, marketed by Tohto Kasei Co., Ltd. respectively), and the like.

The curing agent used as the component (C) in the coating composition of the present invention may include ones to react with a functional group in the above components (A) and (B) for curing, and may be at least one curing agent selected from amino-aldehyde resin and blocked polyisocyanate compound. Of these, the amino-aldehyde resin is preferred.

Examples of the above amino-aldehyde resin may include condensates of an amine component such as melamine, urea, acetoguanamine, benzoguanamine, stearoguanamine, spiroguanamine or the like with an aldehyde component such as formaldehyde, paraformaldehyde, acetoaldehyde, glyoxal and the like, and their etherified products by a lower alkanol such as butanol, methanol or the like. Melamine formaldehyde resin and etherified product thereof are generally used.

The above blocked polyisocyanate compound may include ones prepared by blocking free isocyanate functional group in polyisocyanate compound such as tolylene diisocyanate, xylylene diisocyanate, polymethylene polyphenylene polyisocyanate, hexamethylene diisocyanate, isophorone diisocyanate, diphenyl methane diisocyanate and the like, or polymers thereof by use of a known blocking agent such as phenols, oximes, lactams, alcohols and the like. Examples of commercially available ones may include Coronate 2515 and Coronate 2507 (trade names, marketed by Nippon Polyurethane Industry Co., Ltd. respectively), Burnock D-550 (trade name, marketed by Dainippon Ink & Chemicals, Inc.), Takenate R-815M (trade name, marketed by Takeda Chemical Industries Ltd.), Additol UXL-80 (trade name, marketed by Hoechst A. G.), and the like.

The coating composition of the present invention contains a resin composition consisting of, as a solid content (A) 10 to 90, preferably 20 to 70 parts by weight of at least one resin selected from polyester resin and epoxy-modified polyester resin, (B) 5 to 70, 20 to 50 parts by weight of novolac-based epoxy resin and (C) 5 to 40, preferably 10 to 30 parts by weight of a curing agent per 100 parts by weight of the resin composition respectively.

When an amount of the component (A) is less than 10 parts by weight per 100 parts by weight of the resin composition, a resulting coated film may show poor fabrication properties. On the other hand, when more than 90 parts by weight, a resulting coated film may show poor properties in corrosion resistance and boiling water resistance, and a resulting coating composition may show poor coating workability. When an amount of the component (B) is less than 5 parts by weight, an effect to be obtained by addition of the component (B) may be unsatisfactory, and the resulting coated film may show poor properties in corrosion resistance, particularly in corrosion resistance on an edge face as a cut surface of a coated metal sheet when subjected to salt spray test and in boiling water resistance. On the other hand, in the case where an amount of the component (B) is more than 70 parts by weight, such a topcoating composition as to be cured in the presence of an acid catalyst such as paratoluene sulfonic acid, dodecyl benzene sulfonic acid or the like is coated onto the resulting coated film, inhibition of curing takes place, resulting in making curing properties of the topcoat unsatisfactory, and reducing solvent resistance and fabrication properties of the coated film. When an amount of the component (C) is less than 5 parts by weight, the coated film may show poor curing properties. On the other hand, when more than 40 parts by weight, the resulting coated film may show poor fabrication properties.

In addition to the above resin composition, the coating composition of the present invention contains an anticorrosion pigment as the component (D).

The anticorrosion pigment may include chromate pigments such as calcium chromate, strontium chromate, barium chromate, zinc potassium chromate, tetrabasic zinc chromate and the like; and chrome-free anticorrosion pigments such as aluminum phosphomolybdate, aluminum dihydrogen tripolyphosphate, zinc phosphate, barium metaborate, zinc phytate, calcium phytate, zinc salt of organonitro compound and the like. In the case where high corrosion resistance is particularly needed, the chromate anticorrosion pigments, particularly calcium chromate, strontium chromate, zinc potassium chromate may preferably be used. In the case where the use of the chromate pigment is inhibited from the standpoints of safety and hygiene, chromate-free anticorrosion pigments may be used.

The coating composition of the present invention contains the anticorrosion pigment in an amount of 20 to 120 parts by weight, preferably 30 to 100 parts by weight per 100 parts by weight of the resin composition. When an amount of the anticorrosion pigment (D) is less than 20 parts by weight, the resulting coated film shows unsatisfactory corrosion resistance. On the other hand, when more than 120 parts by weight, the resulting coated film may show poor properties in boiling water resistance and fabrication properties.

The coating composition of the present invention optionally contain color pigments used in the art, for example, organic color pigments such as cyanine blue, cyanine green, organic red pigments such as azo pigment and quinacridone pigment, and the like; inorganic color pigments such as titanium white, titanium yellow, red iron oxide, carbon black, chrome yellow, various kinds of calcined pigments and the like; extendes, pigments such as talc, clay, silica, mica, alumina and the like; fillers, additives, organic solvents, and the like.

A substrate to apply the coating composition of the present invention thereto may preferably include metal sheets such as cold-rolled steel sheet, hot dipped galvanized sheet, electroplated galvanized sheet, iron-zinc alloyplated steel sheet, aluminum-zinc alloyplated sheet, aluminum sheet, stainless steel sheet, copper sheet, copperplate sheet, tinplated sheet and the like, but may also include plastics, wood, cement and the like.

Coating of the coating composition of the present invention may be carried out by a coating method such as curtain-flow coating, roll coating, dip coating, spray coating and the like so as to be a dry film thickness of generally from 2 to 15 µm.

In the case where the substrate is a metal and the surface of the metal is not polluted with a pollutant such as oil or the like, the above coating composition may be coated thereonto as it is. However, in the case where improvements in adhesion properties and corrosion resistance of the coated film are needed, the surface of the substrate may preferably be treated by the conventional metal surface treating process such as the phosphating process and chromating process, or by use of a chromate coating agent and the like.

The coating composition of the present invention may be used as a one coat coating composition, but is suitable for use in a primer because of high corrosion resistance as the coated film, and coating a topcoating composition onto a coated film of the coating composition of the present invention makes it possible to form an overall coated film showing good corrosion resistance and appearance.

The topcoating composition may include any conventionally used topcoating composition in the art, for example, oil free polyester resin coating composition, alkyd resin coating composition such as coconut oil-modified alkyd resin coating composition and the like, silicone-modified polyester resin coating composition, fluorocarbon resin coating composition, and the like, and may be cured under such conditions as to be suitable for respective coating compositions. The coating composition of the present invention may also be coated onto both sides of a metal sheet, followed by coating a topcoating composition thereonto respectively, to be used as a primer for the so-called double coat specification.

Roll coating of the coating composition of the present invention by the coil coating process may usually be carried out by the twin roll coating method, i.e., the so-called reverse coating or natural coating, or by the three roll coating method, and curing may be carried out under such conditions that a maximum temperature of substrate is in the range of 200° C. to 240° C., and a curing time is in the range of 20 to 60 seconds.

A combined use of the novolac-based epoxy resin component (B) of the coating composition of the present invention with other components of the coating composition of the present invention makes it possible to form a coated film showing excellent properties in corrosion resistance, particularly corrosion resistance on an edge face as a cut surface and on a fabricated portion, and the coating composition of the present invention shows good coating workability and is particularly suitable as a primer for use in the precoated steel sheet.

The present invention will be explained more in detail by the following Examples and Comparative Examples, in which "part" and "%" are all by weight.

EXAMPLE 1

A mixture of 125 parts, i.e., 50 parts as the solid content, of 40% Vylon GK-790 (trade name, marketed by Toyobo Co., Ltd., polyester resin solution having a solid content of 40%, a number average molecular weight of the resin: about 20,000, a glass transition temperature of the resin: about 37° C.) 30 parts of Epikote 152 (trade name, marketed by Yuka Shell Epoxy Co., Ltd., phenol novolac epoxy resin), 30 parts of strontium chromate, 30 parts of calcium chromate, 40 parts of titanium white and a suitable amount of a mixed solvent [a 1:1 mixed solvent of Solvesso 150 (trade name, marketed by Esso Standard Oil Co., Ltd., aromatic hydrocarbon based solvent) and cyclohexanone] was prepared, followed by dispersing to such an extent that fineness of grind may be 10 μm or less. Next, to the above dispersion were added 20 parts of Cymel 303 (trade name, marketed by Mitsui Cytec Co., Ltd., methylated melamine resin, solid content: about 100%) and 1.0 part of Nacure 5225 (trade name, marketed by King Industry Co., Ltd., U.S.A., amine salt of dodecylbenzene sulfonic acid, effective ingredient: about 25%) to be uniformly mixed, followed by adding the above mixed solvent to such an extent as to control viscosity at about 80 seconds (Ford cup #4, 25° C.) for obtaining a coating composition.

EXAMPLES 2 TO 10 AND COMPARATIVE EXAMPLES 1 TO 6

Procedures of Example 1 were repeated except that respective formulations represented in the following Table 1 were used to obtain respective coating compositions. In Table 1, respective amounts are all represented by "parts by weight".

In Table 1, (Note 1) to (Note 8) are explained as follows.

(Note 1) 30% Vylon GK-590: Trade name marketed by Toyobo Co., Ltd., polyester resin solution having a solid content of 30%, in which the resin has a number average molecular weight of about 6,000 and a glass transition temperature of about 15° C.

(Note 2) 30% Vylon EP-2940: Trade name, marketed by Toyobo Co., Ltd., epoxy-modified polyester resin solution having a solid content of 30%, in which the resin has a number average molecular weight of about 10,000 and a glass transition temperature of about 72° C.

(Note 3) Epikote 154: Trade name, marketed by Yuka Shell Epoxy Co., Ltd., phenol novolac epoxy resin.

(Note 4) Epikote 180S65: Trade name, marketed by Yuka Shell Epoxy Co., Ltd., cresol novolac epoxy resin.

(Note 5) Cymel 325: Trade name, marketed by Mitsui Cytec Co., Ltd., methyl etherified melamine resin, solid content: 70%.

(Note 6) Coronate 2507: Trade name, marketed by Nippon Polyurethan Industry Co., Ltd., blocked isocyanurate of hexamethylene diisocyanate, solid content: 80%.

(Note 7) K white 105: Trade name, marketed by Teika Co., Ltd., aluminum dihydrogen tripolyphosphate.

(Note 8) Takenate TK-1: Trade name, marketed by Takeda Chemical Industries Ltd., organotin blocking agent dissociation catalyst, solid content: 10%.

The coating compositions obtained in the above Examples and Comparative Examples were subjected to film performance and coating workability tests. The test results are shown in Table 2.

Film Performance Test

Respective coating compositions obtained in the above Examples and Comparative Examples were coated onto a chromate-treated 0.4 mm thick galvanized sheet with a plated zinc amount of 60 g/m² to be a dry film thickness of about 6 μm by use of a bar coater, followed by curing at a maximum temperature of substrate of 220° C. for 50 seconds. Next, onto a coated film obtained as above was coated ALESTEC 100 White (trade name, marketed by Kansai Paint Co., Ltd., polyester resin coating composition for use in higher fabrication, white) to be a film thickness of about 18 μm by use of a bar coater, followed by curing at a maximum temperature of substrate of 225° C. for 60 seconds to obtain respective coated sheets, which were subjected to various film performance tests as explained hereinbelow.

MEK resistance: Four sheets of gauze impregnated with methyl ethyl ketone were piled up on the surface of the above coated metal sheets respectively to be subjected to a reciprocating motion between a distance of about 5 cm under a compressed pressure of 4 kg/cm². A number of the reciprocating motion repeated by the time when a primer film appears was recorded. Cases, in which the primer film does not appear by a repeating number of 50, are represented as 50<.

Fabrication Properties: Respective coated metal sheets were bent at an angle of 180° with a coated film surface facing outside at a room temperature of 20° C. by use of a vise to examine if no crackings develop on a bent portion any more. Evaluation was made by a T number, in which no crackings develop on the bent portion any more. The above T number is defined such that 0T means a case where respective coated metal sheets are bent at an angle of 180° without putting anything inside the bent portion, 1T means a case where respective coated metal sheets are bent so that one sheet of piece may be put inside the bent portion, 2T similarly means a case where two sheets of pieces may be put inside the bent portion, and 3T similarly means a case where three sheets of pieces may be put inside the bent portion.

Boiling Water Resistance: Respective coated metal sheets were dipped into a boiling deionized water at about 100° C. for 4 hours, followed by taking up, and evaluating conditions of the film surface as follows.
⊚: No changes are observed. ○: Small blisters slightly develop. Δ: Blisters develop considerably. ×: Blisters markedly develop all over the surface.

Salt Spray Corrosion Resistance: Respective coated metal sheets were cut down to a size of 80×150 mm, followed by sealing a back surface and cut face with an anticorrosion coating composition, cutting down the sealed first cut coated metal sheet from a back side along two sides of the 150 mm side to form tow edge faces having an upper flash, resulting in forming a second cut coated metal sheet having a size of 70×150 mm. A cross cut reaching to a metal surface was formed around a center of a coated surface of the second cut coated metal sheet, followed by forming a fabricated portion defined as 2T in the above fabrication properties test at a distance of 10 mm from a 70 mm side parallel to the 70 mm side to obtain a test piece, which was subjected to a salt spray test in accordance with JIS Z-2371. The test time was 500 hours. Salt spray corrosion resistance in the edge face and cross cut portion was evaluated by a mean width of blistered area. That in the 2T fabricated portion was evaluated as follows.
⊚: Neither rust nor blister develop at all. ○: White rust and/or blisters slightly develop. Δ: White rust considerably develops, and blisters develop a little. ×: Both white rust and blisters markedly develop.

Moisture Resistance: The same test piece as used in the above salt spray test was placed in a blister box at about 50° C. under about 100% RH for conducting a test for 750 hours. Moisture resistance in the edge face and cross cut portion was evaluated by a mean width of blistered area. That in the 2T fabricated portion was evaluated by the same evaluation standard as the 2T fabricated portion to the above salt spray corrosion resistance.

Coating Workability: Respective coating compositions in respective Examples and Comparative Examples having a viscosity controlled at about 80 seconds as Ford cup #4 at 25° C. were subjected to a reverse coating by use of a twin roll. Coating was carried out to be a target film thickness of 5 to 12 μm under a backup roll speed (line speed) of 90 m/min to evaluate coating workability by the naked eye as follows.
⊚: target film thickness is obtained, and the film surface is uniform. ○: The target film thickness is obtained, but a roll mark is formed a little on the film surface. ×: At least one of such drawbacks that applicability is poor and the target film thickness is not obtained, and that the roll mark is markedly formed on the film surface, and that unevenness of the coated film is marked.

TABLE 1

|   |   |   | Examples | | | | | | | | | | Comparative Examples | | | | | |
|---|---|---|---|---|---|---|---|---|---|---|---|---|---|---|---|---|---|---|
|   |   |   | 1 | 2 | 3 | 4 | 5 | 6 | 7 | 8 | 9 | 10 | 1 | 2 | 3 | 4 | 5 | 6 |
| A | 40% Vylon GK-790 |   | 125 | 162.5 | 87.5 |   |   |   |   | 125 | 125 | 125 | 200 |   | 75 |   | 125 | 125 |
|   | 30% Vylon GK-590 | (Note 1) |   |   |   | 166.7 | 166.7 |   |   |   |   |   |   | 266.7 |   | 16.7 |   |   |
|   | 30% Vylon EP-2940 | (Note 2) |   |   |   |   |   | 233.3 | 66.7 |   |   |   |   |   |   |   |   |   |
| B | Epikote 152 |   | 30 | 20 | 40 |   |   | 20 | 50 | 30 | 30 |   |   | 25 |   | 30 | 30 |   |
|   | Epikote 154 | (Note 3) |   |   |   | 30 |   |   |   |   |   | 30 |   |   | 75 |   |   |   |
|   | Epikote 180S65 | (Note 4) |   |   |   |   | 30 |   |   |   |   |   |   |   |   |   |   |   |
| C | Cymel 303 |   | 20 | 15 | 25 | 20 |   | 10 | 30 |   | 20 |   | 20 | 20 | 45 | 20 | 20 | 20 |
|   | Cymel 325 | (Note 5) |   |   |   |   | 28.6 |   |   |   |   | 28.6 |   |   |   |   |   |   |
|   | Coronate 2507 | (Note 6) |   |   |   |   |   |   |   | 25 |   |   |   |   |   |   |   |   |
| D | Strontium chromate |   | 30 | 60 |   | 60 | 100 | 60 | 30 | 60 |   |   | 30 | 60 | 60 | 60 | 15 | 130 |
|   | Calcium chromate |   | 30 |   | 60 |   |   |   |   |   |   |   | 30 |   |   |   |   |   |
|   | Zinc phosphate K white 105 | (Note 7) |   |   |   |   |   |   |   |   | 60 | 60 |   |   |   |   |   |   |
|   | Titanium white |   | 40 | 40 | 40 | 40 | 30 | 40 | 40 | 40 | 40 | 40 | 40 | 40 | 40 | 40 | 40 | 30 |
|   | Nacure 5225 |   | 1.0 | 1.0 | 1.0 | 1.0 |   | 1.0 | 1.0 |   | 1.0 |   | 1.0 | 1.0 | 1.0 | 1.0 | 1.0 | 1.0 |
|   | Takenate TK-1 | (Note 8) |   |   |   |   |   |   |   | 1.0 |   |   |   |   |   |   |   |   |

TABLE 2

| | | | Examples | | | | | | | | | | Comparative Examples | | | | | |
|---|---|---|---|---|---|---|---|---|---|---|---|---|---|---|---|---|---|---|
| | | | 1 | 2 | 3 | 4 | 5 | 6 | 7 | 8 | 9 | 10 | 1 | 2 | 3 | 4 | 5 | 6 |
| Test Items | | | | | | | | | | | | | | | | | | |
| MEK resistance | | | 50< | 50< | 50< | 50< | 50< | 50< | 50< | 50< | 50< | 50< | 50< | 50< | 50< | 15 | 50< | 50< |
| Fabrication properties | | | 0T | 1T | 0T | 0T | 0T | 1T | 1T | 0T | 0T | 0T | 1T | 0T | 3T | 1T | 0T | 2T |
| Boiling Water Resistance | | | ◉ | ◉ | ◉ | ◉ | ◉ | ◉ | ◉ | ◉ | ◉ | ◉ | Δ | Δ | ◉ | Δ | ◉ | x |
| Salt spray corrosion resistance | Mean width of blistered area (mm) | Edge face portion | 0 | 0 | 0 | 0 | 0 | 0 | 2 | 3 | 6 | 6 | 5 | 6 | 0 | 3 | 7 | 0 |
| | | Cross cut portion | 0 | 0 | 0 | 0 | 0 | 0 | 1 | 2 | 3 | 2 | 2 | 2 | 0 | 2 | 3 | 0 |
| | 2T fabricated portion | | ○ | ○ | ○ | ○ | ◉ | ○ | ○ | ○ | ○ | ○ | Δ | Δ | Δ | ○ | Δ | ○ |
| Moisture resistance | Mean width of blistered area (mm) | Edge face portion | 0 | 0 | 0 | 0 | 0 | 0 | 1 | 2 | 2 | 2 | 4 | 5 | 0 | 2 | 4 | 0 |
| | | Cross cut portion | 0 | 0 | 0 | 0 | 0 | 0 | 0 | 1 | 1 | 1 | 2 | 2 | 0 | 1 | 2 | 0 |
| | 2T fabricated portion | | ○ | ○ | ○ | ○ | ◉ | ○ | ○ | ○ | ○ | ○ | Δ | Δ | Δ | ○ | Δ | ○ |
| | Coating Workability | | ◉ | ◉ | ◉ | ◉ | ◉ | ◉ | ◉ | ◉ | ◉ | ◉ | x | x | ◉ | ◉ | ◉ | ◉ |

What is claimed is:

1. A coating composition containing a resin composition consisting of (A) 10 to 90 parts by weight of at least one resin selected from the group consisting of a polyester resin having a glass transition temperature of −5° C. to 80° C. and a number average molecular weight of 5,000 to 30,000, and an epoxy-modified polyester resin having a glass transition temperature of 10° C. to 130° C. and a number average molecular weight of 6,000 to 30,000; (B) 5 to 70 parts by weight of a novolac-based epoxy resin; (C) 5 to 40 parts by weight of a curing agent per 100 parts by weight of the resin composition respectively; and (D) 20 to 120 parts by weight of an anticorrosion pigment per 100 parts by weight of the resin composition, said glass transition temperature being measured by a differential thermal analysis at a heating speed of 10° C./minute.

2. The coating composition as claimed in claim 1, wherein said coating composition contains a resin composition consisting of (A) 20 to 70 parts by weight of at least one resin selected from the group consisting of a polyester resin having a glass transition temperature of −5° C. to 80° C. and a number average molecular weight of 5,000 to 30,000, and an epoxy-modified polyester resin having a glass transition temperature of 10° C. to 130° C. and a number average molecular weight of 6,000 to 30,000; (B) 20 to 50 parts by weight of a novolac-based epoxy resin; (C) 10 to 30 parts by weight of a curing agent per 100 parts by weight of the resin composition respectively; and (D) 30 to 100 parts by weight of an anticorrosion pigment per 100 parts by weight of the resin composition, said glass transition temperature being measured by a differential thermal analysis at a heating speed of 10° C./minute.

3. The coating composition as claimed in claim 1, wherein the novolac-based epoxy resin is selected from the group consisting of a phenolic novolac epoxy resin, a cresol novolac epoxy resin and a phenol glyoxalic epoxy resin having 4 to 16 epoxy groups in the molecule, and has a number average molecular weight of 600 to 2,000.

4. The coating composition as claimed in claim 1, wherein the curing agent is at least one curing agent selected from the group consisting of an amino-aldehyde resin and blocked polyisocyanate compound.

5. The coating composition as claimed in claim 1, wherein the curing agent is an amino-aldehyde resin.

6. The coating composition as claimed in claim 1, wherein the anticorrosion pigment is a chrome-free anticorrosion agent.

7. The coating composition as claimed in claim 1, wherein the anticorrosion pigment is a chromate pigment.

8. A coating composition as claimed in claim 1 for use in a primer for a precoated metal sheet.

* * * * *